(12) United States Patent
Hadzicki

(10) Patent No.: US 7,607,615 B2
(45) Date of Patent: Oct. 27, 2009

(54) BRAKE FOR A KITE

(75) Inventor: Joseph Hadzicki, Coronado, CA (US)

(73) Assignee: Revolution Enterprises, Inc., Poway, CA (US)

( * ) Notice: Subject to any disclaimer, the term of this patent is extended or adjusted under 35 U.S.C. 154(b) by 202 days.

(21) Appl. No.: 11/327,300

(22) Filed: Jan. 6, 2006

(65) Prior Publication Data

US 2007/0170308 A1   Jul. 26, 2007

(51) Int. Cl.
*A63H 27/08* (2006.01)
*B64C 31/06* (2006.01)
*F41J 9/08* (2006.01)

(52) U.S. Cl. .............................. 244/153 R; 244/155 R

(58) Field of Classification Search ............. 244/153 R, 244/154, 155 R, 155 A, 153 A; 267/216, 267/291; D21/445
See application file for complete search history.

(56) References Cited

U.S. PATENT DOCUMENTS

| | | | | | |
|---|---|---|---|---|---|
| 3,161,386 | A | * | 12/1964 | Umanoff | 244/153 R |
| 3,335,984 | A | * | 8/1967 | Holland, Jr. | 244/153 R |
| 3,347,500 | A | * | 10/1967 | Hartig | 244/154 |
| 4,202,578 | A | * | 5/1980 | Roullier et al. | 296/37.16 |
| 4,807,832 | A | * | 2/1989 | Tabor | 244/153 R |
| 6,722,613 | B1 | * | 4/2004 | Phillips et al. | 244/153 R |

* cited by examiner

*Primary Examiner*—Michael R Mansen
*Assistant Examiner*—Philip J Bonzell
(74) *Attorney, Agent, or Firm*—Mintz, Levin, Cohen, Ferris, Glovsky and Popeo, P.C.

(57) ABSTRACT

A kite brake and a kite that uses a brake are disclosed. The brake includes a spring-loaded standoff that is biased to push a top surface of a sail of the kite away from a strut of the kite when an air pressure on the bottom surface of the sail is less than a bias force of the spring. The brake can be deployed by operation of the kite, or simply based on a removal of the air pressure.

20 Claims, 3 Drawing Sheets

BRAKE FOR A KITE

BACKGROUND

Kites utilize air pressure from wind to create lift and provide direction. Wind, however, is unpredictable, both in its force and direction. In high-performance kites, such as kites used with a ski, a skateboard, or other wheeled vehicle, which are also known as "power kites," the unpredictability of wind can lead to disastrous results. These types of kites generate significant power and pulling forces, but do not provide any counter control against the unpredictable forces of wind. A high-performance kite can pull a human through trees, across buildings, or through other adverse terrains unless such kite can be adequately controlled.

Stability of a kite is attributable not only to the type of wind force it experiences, but also the flying lines and bridle of the kite. Unlike an airplane, which is not tethered by lines, a kite must have line tension to provide control. When line tension is lost, the kite becomes aerodynamically unstable, and control is lost. If the nose, or "leading edge" of the kite rotates below a zero angle relative to the wind direction, the wind will push the kite toward the flyer to cause loss of tension and loss of kite control. Power kite designers have been trying for years, unsuccessfully, to design a kite that can be completely de-powered while allowing an operator of the kite to maintain total control.

SUMMARY

This document discloses a control system for a kite. Specifically, a kite brake is disclosed that causes the kite sail to dynamically change shape to create a stable, gliding wing surface. The kite brake enables the kite to immediately transfer from a flying mode in which the kite is formed into an concave airfoil relative to a bottom side of the kite, to a braking mode in which the kite is formed into a concave airfoil relative to a top side of the kite. In other words, a brake is adapted to reverse the shape of the kite wing, as defined by the sail.

In accordance with one aspect, a kite brake includes a spring-loaded standoff that is biased to push a top surface of a sail of the kite away from a strut of the kite when an air pressure on the bottom surface of the sail is less than a bias force of the spring. The kite brake causes a "nose up" rotation, thus re-establishing line tension and kite control, at the same time reducing the pull of the kite to substantially zero.

In another aspect, a kite is disclosed. The kite includes a sail having a top surface and a bottom surface, and at least one strut supporting the sail along the top surface of the sail. The kite further includes a spring-loaded standoff that is biased to push a top surface of the sail away from the at least one strut when an air pressure on the bottom surface of the sail is less than a bias force of the spring.

In yet another aspect, a kite includes a sail having a top surface and a bottom surface. The sail is responsive to an air pressure on the bottom surface to form a concave airfoil relative to the bottom surface of the sail. The kite further includes at least one strut traversing the top surface of the sail, and a brake. The brake includes a spring-loaded standoff that is biased to push the top surface of the sail away from the at least one strut when the air pressure on the bottom surface of the sail is less than a bias force of the spring to form a convex airfoil relative to the bottom surface of the sail.

In yet another aspect, a kite includes a leading edge pole defining a nose of the kite, and a sail having a top surface and a bottom surface. The kite further includes at least one strut traversing the top surface of the sail, and one or more control lines connected to the at least one strut, and configured to be maintained under tension when an air pressure is applied to the bottom surface of the sail. The kite further includes a spring-loaded standoff that is biased to push against the top surface of the sail from the at least one strut when the air pressure on the bottom surface of the sail is less than a bias force of the spring. The at least one strut is configured to rotate the leading edge pole to turn up the nose of the kite when the standoff is pushed against the top surface of the sail.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a kite and a kite brake. The brake enables an operator of the kite to immediately change the airfoil shape of the kite to eliminate lift and remove power. In other words, the brake dynamically changes the shape of the sail surface to create a stable, gliding wing surface. Accordingly, the operator has much greater control of the kite, particularly in situations in which the kite is being used to pull the user, such as on a vehicle or other form of wind-driven conveyance.

Figure 1:
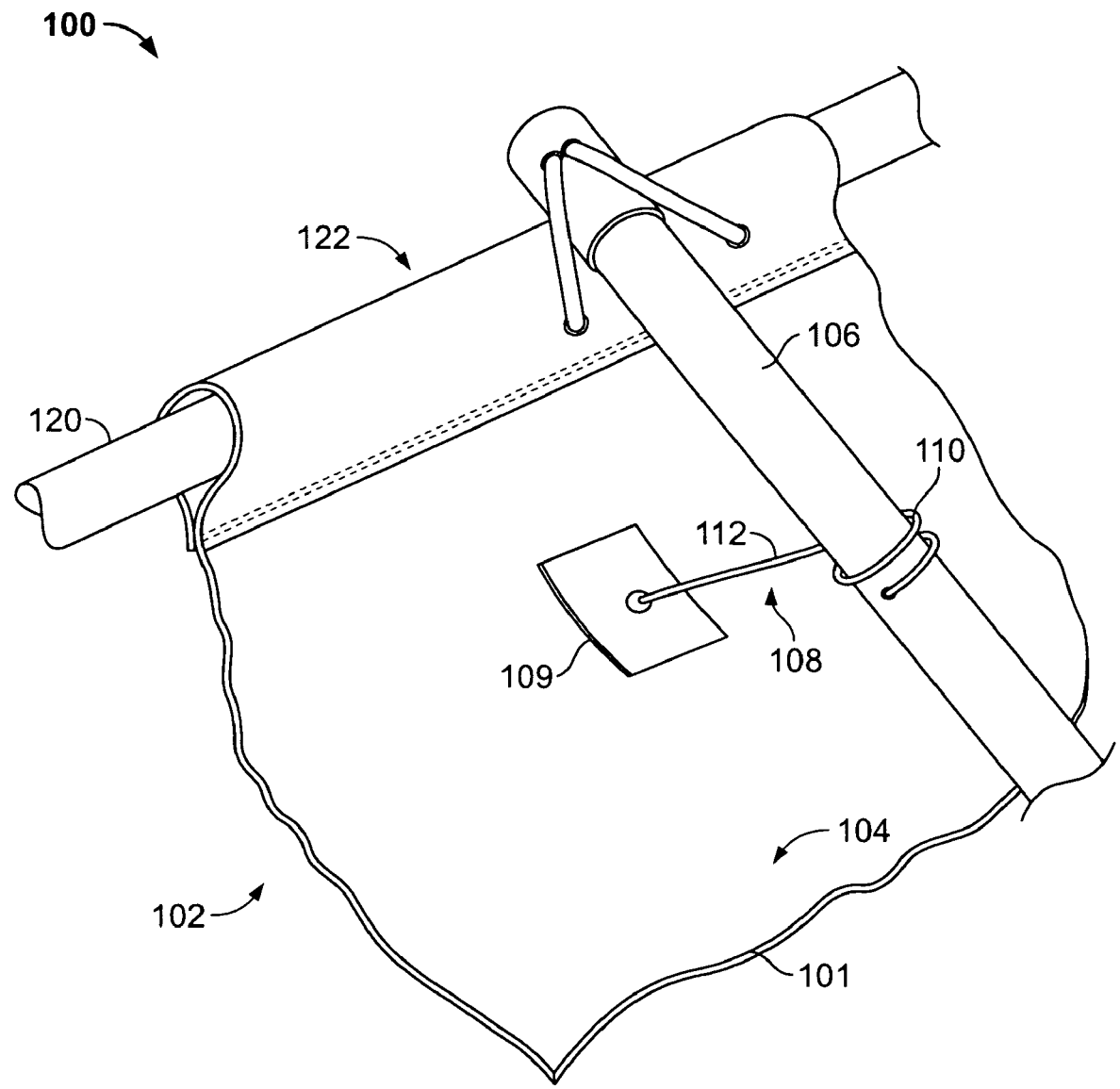
FIG. 1 illustrates a portion of a top surface of a kite with a brake.

FIG. 1 shows a portion 102 of a top surface 104 of a kite 100, i.e. the surface of the kite 100 that faces away from an operator and opposite the wind. The kite 100 includes a sail 101, typically a flexible material or fabric, and one or more struts 106 that traverses the top surface 104 of the sail 101. The struts 106 support the shape of the kite and provide stability and maneuverability. The struts 106 can also act as an attachment point for control strings, etc. Each strut 106 can be connected to a leading edge pole 120 that defines a leading edge 122 of the kite 100.

The kite 100 includes a brake 108. The brake 108 is coupled with a strut 106 and configured to push the top surface 104 of the sail 101 away from the strut 106. The brake 108 is preferably spring-loaded, having a spring 110 that activates and deploys a rod 112. In some embodiments, the spring 110 is a coiled spring that is wound around the strut 106 and biased against the sail 101. The sail 101 may include a patch 109 or a pocket against or in which a distal end of the rod 112 is coupled.

In a preferred embodiment, when a pressure of force of air from wind that exceeds the bias force of the spring 110 is applied to the opposite (i.e. bottom) surface of the kite 100, the brake 108 is deactivated and the sail 101 adapted to capture the wind. In alternative embodiments, the brake 108 can be activated, and the rod 112 deployed, manually or electronically. In still other alternatives, the strut 106 can be rotated to assist in deployment of the brake 108.

In alternative embodiments, the sail 101 itself can form a spring-loaded brake. The sail 101 can be made of a semi-rigid material such as plastic or composite fiber, and can be formed into a concave sail relative to the top surface ("concave-up") according to any of several manufacturing processes. When the air pressure on the bottom surface of the kite exceeds a threshold, the sail 101 pops into a concave-down shape, and when the air pressure drops below the threshold, the sail 101 pops into or is returned to a concave-up shape.

Figure 2:
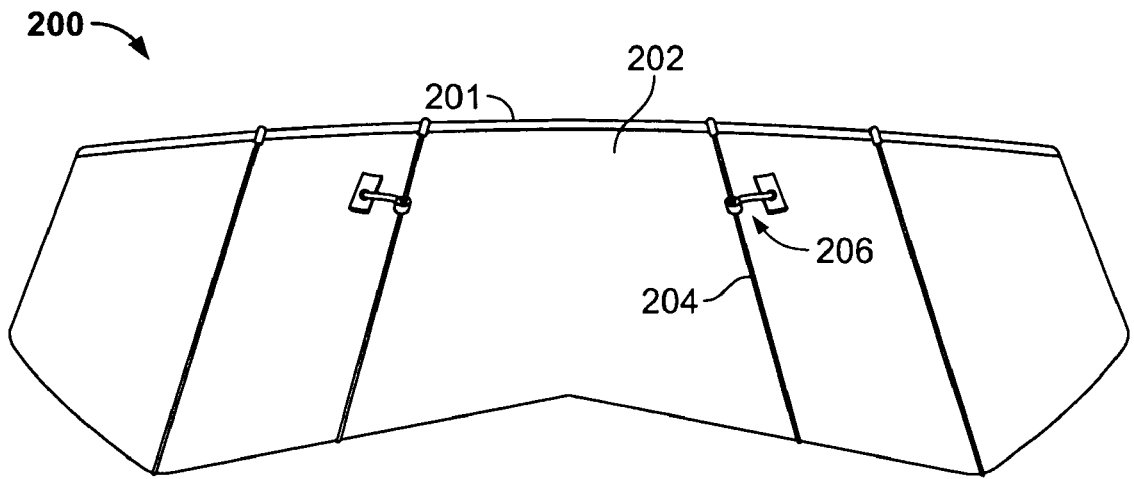
FIG. 2 depicts a kite having a number of brakes.

FIG. 2 depicts a kite 200 having a leading edge 201, a sail 202 that is connected to the leading edge and defines the shape of the kite 200, and which captures wind power to provides lift, and a number of struts 204 that traverse a top surface of the sail 202. The kite 200 includes a number of brakes 206, substantially as described above, each of which can be connected to a strut 204 at particular locations along the top surface of the sail 202.

Figure 3A:
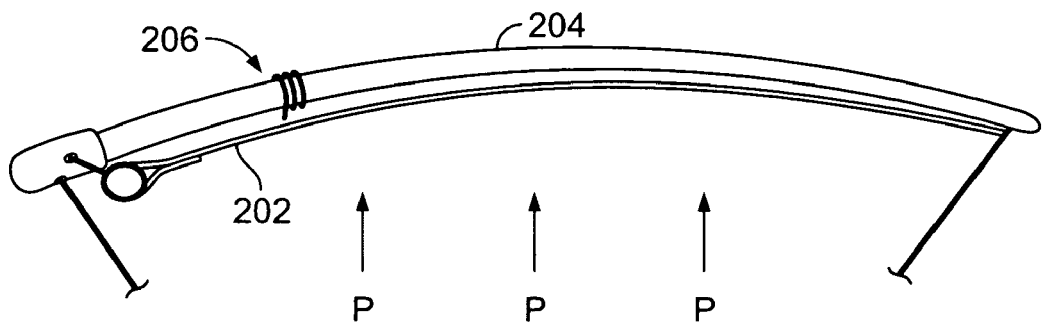
FIG. 3 illustrates the operation of a kite brake.

With reference still to FIG. 2, FIG. 3 illustrates the operation of the brakes 206 for the kite 200 in flight. As shown in FIG. 3A, when a pressure p from air or wind is applied against a bottom surface of the sail 202 (depicted under the strut 204), the sail 202 captures the air and forms a concave airfoil relative to the bottom surface of the sail 202, and the kite 200 achieves lift and direction. With the spring-loaded brake 206 added, if the pressure p exceeds the bias force of the spring-loaded brake, the kite 200 will still act substantially as shown in FIG. 3A.

Figure 3B:
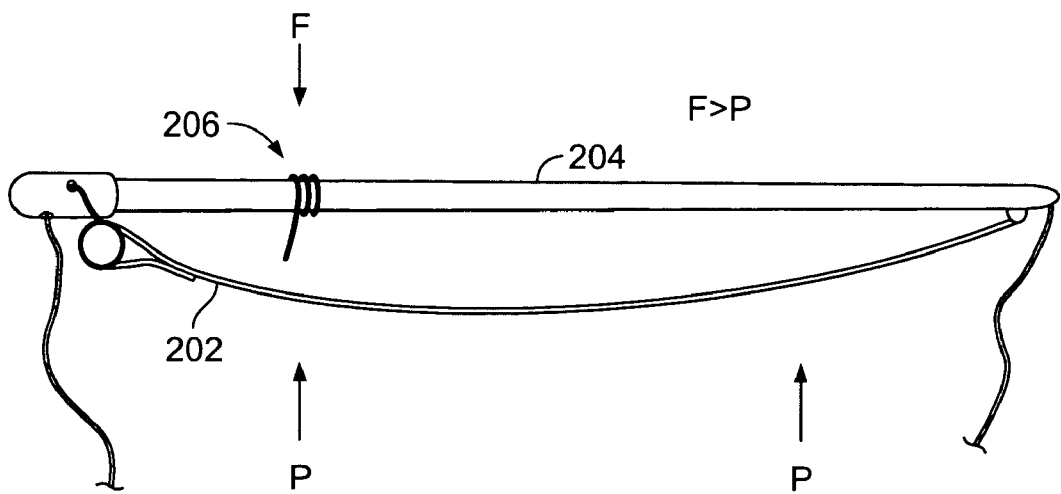

If, however, the pressure p is less than the bias force f of the spring in the spring-loaded brake 206, a condition illustrated in FIG. 3B occurs, where the brake 206 pushes the top surface of the sail 202 away from the strut 204, and the kite 200 is formed into an airfoil that is concave relative to the top surface of the sail 202. This condition results in a stable gliding wing form that removes the lift and power from the airfoil formed in FIG. 3A. Accordingly, the kite 200 will simply glide to a stop, and not stall or fall uncontrollably.

Figure 4A:
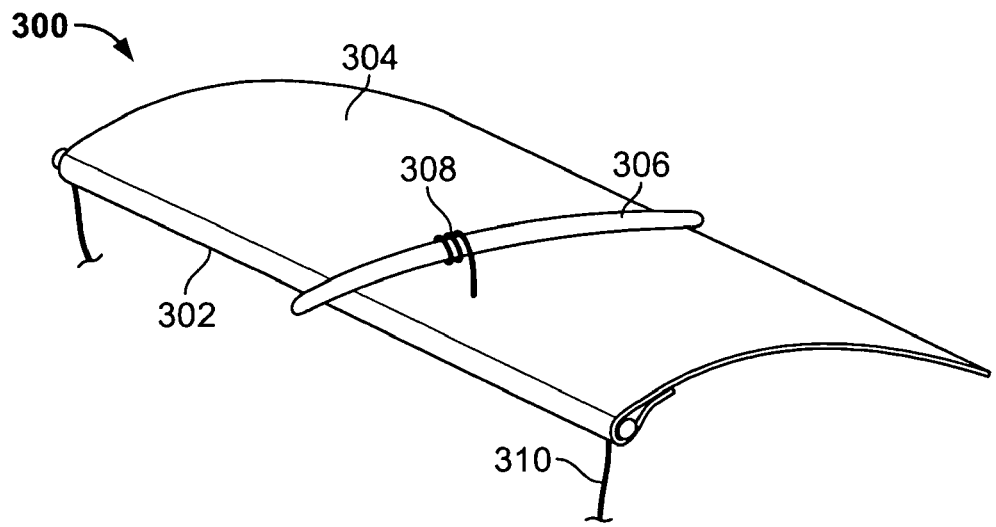
FIG. 4 illustrates detailed operation of a kite and a sail of the kite.
Figure 4B:
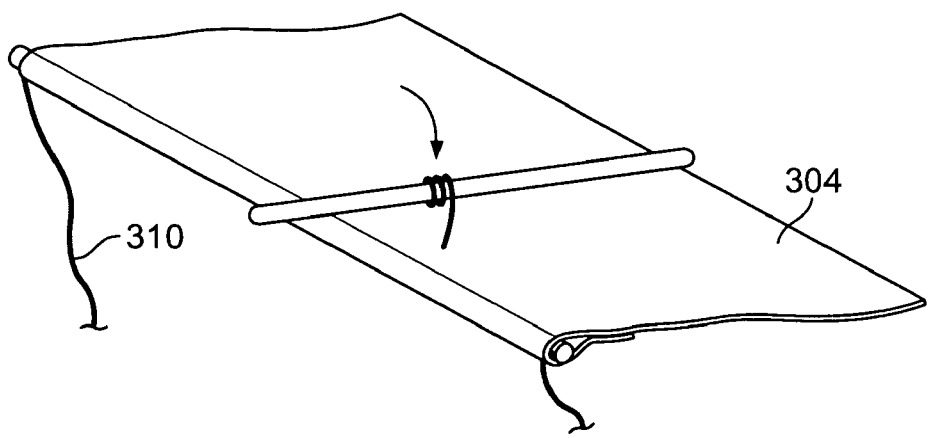
Figure 4C:
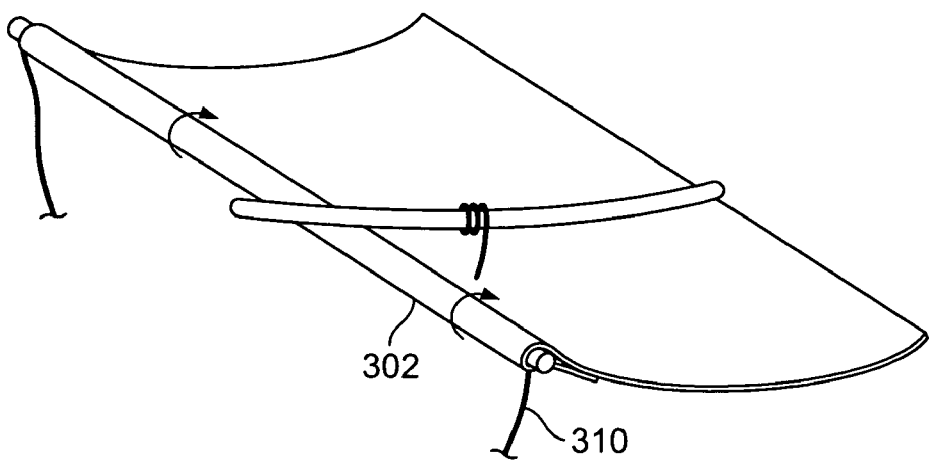

FIGS. 4A-4C further illustrate detailed operation of a kite 300 in accordance with some embodiments. The kite 300 includes a leading edge pole 302 that defines a nose of the kite 300, and a sail 304 having a top surface and a bottom surface. The kite 300 further includes at least one strut 306 that traverses the top surface of the sail 304, and one or more control lines 310 that are connected to strut 306, the leading edge pole 302, or the sail 304 (or any combination thereof). The control lines 310 are configured to be maintained under tension when an air pressure is applied to the bottom surface of the sail, as shown in FIG. 4A.

When tension of the control lines 310 is lost, the kite 300 becomes unstable. Tension can be lost when the kite 300 rotates below a zero angle relative to the direction of the air pressure (wind). To maintain control of the kite 300, and yet simultaneously remove power, the kite 300 includes a spring-loaded standoff 308, preferably connected to the strut 306. The standoff is biased to push against the top surface of the sail from the at least one strut when the air pressure on the bottom surface of the sail is less than a bias force of the spring, as shown in FIG. 4B. Activation of the standoff 308 causes, either on its own or by its force between the sail 304 and the strut 306, rotation of the leading edge pole 302 in a direction toward the top surface of the sail 304, as shown in FIG. 4C. This rotation causes the nose of the kite 300 to turn "up" and thereby restore tension to the control lines 310. Further, this orientation forms the kite 300 into a reverse lift airfoil, removing lift force.

In accordance with several alternative embodiments, when the sail 304 is formed as a spring-loaded sail, as discussed above, no spring loaded standoff 308 is needed. A concave sail 304 that can switch between a concave-up shape to a concave-down shape, and then back again to a concave-up shape, based on an air pressure respectively exceeding or dropping below a threshold, the kite 300 will operate substantially as above.

Although a few embodiments have been described in detail above, other modifications are possible. Other embodiments may be within the scope of the following claims.

The invention claimed is:

1. A kite brake for a kite, the kite brake comprising:
a spring-loaded standoff connected to a strut of the kite between opposite ends of the strut, the spring-loaded standoff biased to push a top surface of a sail of the kite away from the strut of the kite when an air pressure on the bottom surface of the sail is less than a bias force of the spring, to form the sail into a concave-up shape that removes lift from the kite.

2. The kite brake in accordance with claim 1, wherein the spring includes a coil configured for being wound around the strut.

3. The kite brake in accordance with claim 2, wherein the standoff further includes a rod having a first end configured to be coupled to the coil and a second end configured to abut the top surface of the sail.

4. The kite brake in accordance with claim 1, wherein when the standoff pushes the top surface of the sail away from the strut, the sail is formed into a concave airfoil relative to the top surface of the sail.

5. The kite brake in accordance with claim 4, wherein when the air pressure is greater than the bias force of the spring, the sail is formed into a concave airfoil relative to the bottom surface of the sail.

6. A kite comprising:
a sail having a top surface and a bottom surface;
at least one strut supporting the sail along the top surface of the sail;
a spring-loaded standoff connected to the at least one strut between opposite ends of the strut, the spring-loaded standoff biased to push a top surface of the sail away from the at least one strut when an air pressure on the bottom surface of the sail is less than a bias force of the spring, to form the sail into a concave-up shape that removes lift from the kite.

7. The kite in accordance with claim 6, wherein the spring includes a coil that is wound around the strut.

8. The kite in accordance with claim 7, wherein the standoff further includes a rod having a first end coupled to the coil and a second end to abut the top surface of the sail.

9. The kite in accordance with claim 6, wherein when the standoff pushes the top surface of the sail away from the strut, the sail is formed into a concave airfoil relative to the top surface of the sail.

10. The kite in accordance with claim 9, wherein when the air pressure is greater than the bias force of the spring, the sail is formed into a concave airfoil relative to the bottom surface of the sail.

11. A kite comprising:
a sail having a top surface and a bottom surface, the sail being responsive to an air pressure on the bottom surface to form a concave airfoil relative to the bottom surface of the sail;
a strut traversing the top surface of the sail;
a spring-loaded standoff connected to the strut between opposite ends of the strut, the spring-loaded standoff biased to push the top surface of the sail away from the strut when the air pressure on the bottom surface of the sail is less than a bias force of the spring to form a convex airfoil for the whole sail relative to the bottom surface of the sail, to remove lift from the kite.

12. The kite in accordance with claim 11, further comprising at least two struts, each strut including a spring-loaded standoff.

13. The kite in accordance with claim 11, wherein the spring includes a coil that is wound around the strut.

14. The kite in accordance with claim 11, wherein the standoff further includes a rod having a first end coupled to the coil and a second end to abut the top surface of the sail.

15. The kite in accordance with claim 11, further comprising a leading edge pole coupled with the at least one strut at a leading edge of the sail.

16. The kite in accordance with claim 15, wherein the standoff is configured to rotate the leading edge pole in orientation with the convex airfoil relative to the bottom surface of the sail.

17. A kite comprising:
 a leading edge pole defining a nose of the kite;
 a sail having a top surface and a bottom surface;
 at least one strut traversing the top surface of the sail;
 one or more control lines connected with the kite, and configured to be maintained under tension when an air pressure is applied to the bottom surface of the sail;
 a spring-loaded standoff connected to the at least one strut between opposite ends of the strut, the spring-loaded standoff biased to push against the top surface of the sail from the at least one strut when the air pressure on the bottom surface of the sail is less than a bias force of the spring, the at least one strut configured to rotate the leading edge pole to turn up the nose of the kite when the standoff is pushed against the top surface of the sail, to form the sail into a concave-up shape that removes lift from the kite.

18. The kite in accordance with claim 17, wherein rotation of the leading edge pole to turn up the nose of the kite causes at least one of the one or more control lines to be momentarily loose before being re-maintained under tension.

19. A kite, comprising:
 a spring-loaded sail biased to a concave-up shape, the spring-loaded sail configured to switch entirely to a concave-down shape when an air pressure on a bottom surface of the spring-loaded sail exceeds a bias force of the spring-loaded sail, to form the sail into a concave-up shape that removes lift from the kite, and further configured to return to the concave-up shape when the air pressure drops below the bias force of the spring-loaded sail.

20. The kite in accordance with claim 19, further comprising one or more control lines coupled with the kite, the control lines being controllable to adjust the air pressure on the bottom surface of the spring-loaded sail.

* * * * *